W. PROBASCO.
Centrifugal Apparatus for Extracting Honey from the Comb.
No. 134,561. Patented Jan. 7, 1873.
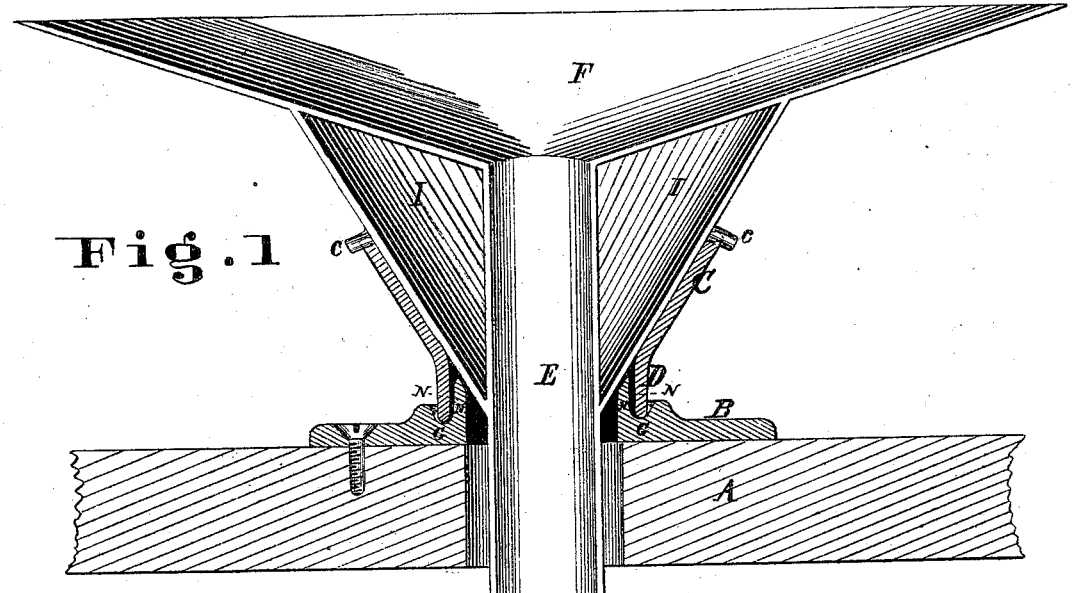
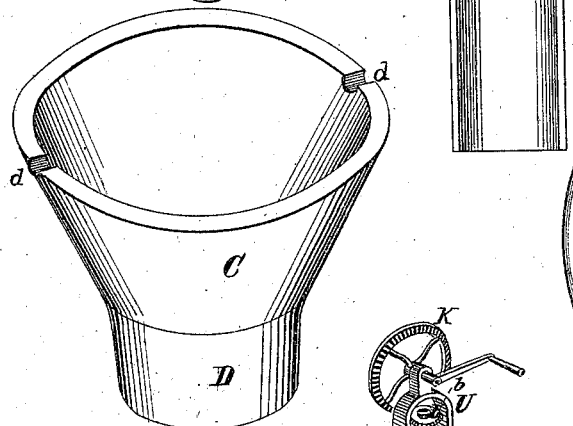
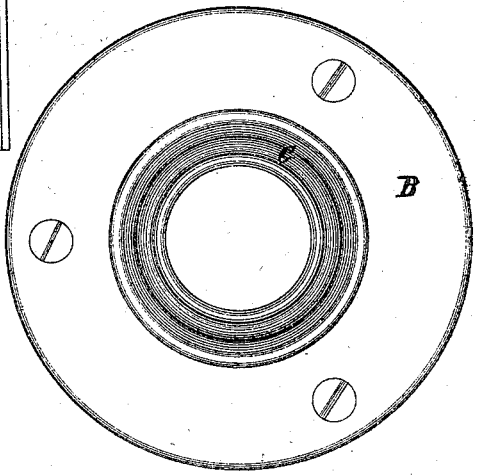
Attest
James L. Norris
Wm. J. Peyton
Inventor
William Probasco
By Wood & Boyd
attys.

UNITED STATES PATENT OFFICE.

WILLIAM PROBASCO, OF LAWRENCEBURG, INDIANA.

IMPROVEMENT IN CENTRIFUGAL APPARATUS FOR EXTRACTING HONEY FROM THE COMB.

Specification forming part of Letters Patent No. 134,561, dated January 7, 1873.

*To all whom it may concern:*

Be it known that I, WILLIAM PROBASCO, of Lawrenceburg, Dearborn county, State of Indiana, have invented certain Improvements in Centrifugal Honey-Extractors, of which the following is a specification:

My invention relates to the mode of constructing a revolving vessel containing the honey-comb; and consists in so constructing it and combining it with the frame of the machine that the fluid honey is discharged into a vessel beneath the machine without coming in contact with the joint upon which the vessel turns, all of which will be more fully understood by reference to the accompanying specification and drawing, making a part of the same, in which—

Figure 1 represents a central vertical section of the lower part of the revolving vessel with its joint connection. Fig. 2 is a perspective view of the annular step. Fig. 3 is a perspective view of the annular groove-bearing; and Fig. 4 is a perspective view of a machine embodying my invention.

A O P S designate the frame of the machine, the construction and arrangement of which are clearly shown in Fig. 4. H is a circular vessel, constructed of tin or other sheet metal, the bottom F of which is made concave, as shown. E is a funnel or delivery spout projecting downward from the center of F, for the discharge of the liquid honey extracted from the comb. I is a conical piece of metal soldered to parts F and E, and performs two offices—first, to strengthen the parts of the revolving vessel; and, second, to fit into the annular step C. B is plate of metal with an annular groove-bearing, G, as shown in Figs. 1 and 3, in the center of which is a hole for the funnel-spout E to project through. D C is a hollow step, funnel-shaped at the top, with the lower part D cylindrical, adapted to fit and turn properly in groove G, as clearly shown in Figs. 1 and 2. *d d* are slots for lugs *c c* to rest in, and whereby the step C is connected to and caused to revolve with the vessel H. The bottom board A of the frame supports the operative parts of the machine, and should be raised a sufficient distance above the feet S to allow a vessel, P', to be placed under the spout E to receive the liquid honey extracted from the comb. U is a bracket-bearing to support the gear-wheels K L. A handle is attached to the wheel K, the turning of which revolves the vessel H.

This method of construction of honey-extractors allows the honey to be delivered into the receiving-vessel P' without coming in contact with any bearings, and allows the vessel H to be constructed entirely of tin, and the bearings to be made of cast-iron or other suitable metal. The frame containing the honey-comb may be placed in the vessel H, and secured while the honey is extracted by any method now in common use. By this mode of constructing the machine, I am enabled to keep the honey entirely pure by preventing it from coming in contact with the rubbing parts of the step. The honey is delivered into a suitable vessel as rapidly as it is extracted.

My machine is light, cheap, and easily transported.

It is obvious that the hollow step C D may be dispensed with and the machine still operate, though in an inferior manner, by providing a suitable bearing for the funnel-spout or hollow journal E.

Having described my machine, what I claim as new, is—

1. The combination of the funnel-spout E with the hollow step C and annular groove-bearing B of a honey-extractor, all substantially as herein set forth.

2. I claim the hollow step D of the cone C, with an annular groove-bearing, B, arranged with a suitable delivery-spout, constructed substantially as herein set forth.

3. The revolving vessel H having concave bottom F and hollow journal-spout E, substantially as described.

WILLIAM PROBASCO.

Witnesses:
JOHN O. MCCORMICK,
OMER THUDLEW.